(12) United States Patent
Jones et al.

(10) Patent No.: US 8,730,637 B2
(45) Date of Patent: May 20, 2014

(54) SURGE PROTECTION DEVICES THAT FAIL AS AN OPEN CIRCUIT

(75) Inventors: Jonathan L. Jones, Carson City, NV (US); Louis Ki Won Chang, Carson City, NV (US)

(73) Assignee: Transtector Systems, Inc., Hayden, ID (US)

( * ) Notice: Subject to any disclaimer, the term of this patent is extended or adjusted under 35 U.S.C. 154(b) by 211 days.

(21) Appl. No.: 13/330,497

(22) Filed: Dec. 19, 2011

(65) Prior Publication Data

US 2012/0154167 A1 Jun. 21, 2012

Related U.S. Application Data

(60) Provisional application No. 61/424,444, filed on Dec. 17, 2010.

(51) Int. Cl.
*H01C 7/12* (2006.01)
*H02H 9/04* (2006.01)
*H02H 3/04* (2006.01)

(52) U.S. Cl.
CPC ............... *H02H 9/042* (2013.01); *H02H 3/048* (2013.01)
USPC .......................................... 361/117; 361/118

(58) Field of Classification Search
USPC ................................................ 361/117–120
See application file for complete search history.

(56) References Cited

U.S. PATENT DOCUMENTS

| | | |
|---|---|---|
| 2,030,179 A | 2/1936 | Potter |
| 3,167,729 A | 1/1965 | Hall |
| 3,323,083 A | 5/1967 | Ziegler |
| 3,619,721 A | 11/1971 | Westendorp |
| 3,663,901 A | 5/1972 | Forney, Jr. |
| 3,731,234 A | 5/1973 | Collins |
| 3,750,053 A | 7/1973 | LeDonne |
| 3,783,178 A | 1/1974 | Philibert |
| 3,831,110 A | 8/1974 | Eastman |
| 3,845,358 A | 10/1974 | Anderson et al. |
| 3,944,937 A | 3/1976 | Fujisawa et al. |
| 3,980,976 A | 9/1976 | Tadama et al. |
| 4,046,451 A | 9/1977 | Juds et al. |
| 4,047,120 A | 9/1977 | Lord et al. |
| 4,112,395 A | 9/1978 | Seward |

(Continued)

FOREIGN PATENT DOCUMENTS

| | | |
|---|---|---|
| CH | 675933 | 11/1990 |
| JP | 08-066037 | 3/1996 |

(Continued)

*Primary Examiner* — Danny Nguyen (74) *Attorney, Agent, or Firm* — Snell & Wilmer LLP (57) ABSTRACT

A surge protection apparatus or method for opening a surge path upon failure of a surge protection element as a short. The surge protection device may include a switch controlled by a solenoid or other switch controlling component that changes a position of the switch if the surge protection element fails as a conductive element. A first position of the switch is configured to allow transmittal of a signal from a signal connection, through the surge protection element, and to a ground connection. A second position of the switch is configured to prevent transmittal of a signal from the signal connection, through the surge protection element, and to the ground connection. A delay may be added between the changing of the switch position after the surge protection element fails as a conductor. Visual or other notifiers may indicate when the switch is in the second position.

21 Claims, 4 Drawing Sheets

(56) References Cited

U.S. PATENT DOCUMENTS

| | | |
|---|---|---|
| 4,262,317 A | 4/1981 | Baumbach |
| 4,356,360 A | 10/1982 | Volz |
| 4,359,764 A | 11/1982 | Block |
| 4,384,331 A | 5/1983 | Fukuhara et al. |
| 4,409,637 A | 10/1983 | Block |
| 4,481,641 A | 11/1984 | Gable et al. |
| 4,554,608 A | 11/1985 | Block |
| 4,563,720 A | 1/1986 | Clark |
| 4,586,104 A | 4/1986 | Standler |
| 4,689,713 A | 8/1987 | Hourtane et al. |
| 4,698,721 A | 10/1987 | Warren |
| 4,727,350 A | 2/1988 | Ohkubo |
| 4,952,173 A | 8/1990 | Peronnet et al. |
| 4,984,146 A | 1/1991 | Black et al. |
| 4,985,800 A | 1/1991 | Feldman et al. |
| 5,053,910 A | 10/1991 | Goldstein |
| 5,057,964 A | 10/1991 | Bender et al. |
| 5,102,818 A | 4/1992 | Paschke et al. |
| 5,122,921 A | 6/1992 | Koss |
| 5,124,873 A | 6/1992 | Wheeler |
| 5,142,429 A | 8/1992 | Jaki |
| 5,166,855 A | 11/1992 | Turner |
| 5,170,151 A * | 12/1992 | Hochstein ............... 340/636.15 |
| 5,278,720 A | 1/1994 | Bird |
| 5,321,573 A | 6/1994 | Persona et al. |
| 5,353,189 A | 10/1994 | Tomlinson |
| 5,412,526 A * | 5/1995 | Kapp et al. ............... 361/56 |
| 5,442,330 A | 8/1995 | Fuller et al. |
| 5,537,044 A | 7/1996 | Stahl |
| 5,611,224 A | 3/1997 | Weinerman et al. |
| 5,617,284 A | 4/1997 | Paradise |
| 5,625,521 A | 4/1997 | Luu |
| 5,667,298 A | 9/1997 | Musil et al. |
| 5,721,662 A | 2/1998 | Glaser et al. |
| 5,781,844 A | 7/1998 | Spriester et al. |
| 5,790,361 A | 8/1998 | Minich |
| 5,798,790 A | 8/1998 | Knox et al. |
| 5,844,766 A | 12/1998 | Miglioli et al. |
| 5,854,730 A | 12/1998 | Mitchell et al. |
| 5,953,195 A | 9/1999 | Pagliuca |
| 5,966,283 A | 10/1999 | Glaser et al. |
| 5,982,602 A | 11/1999 | Tellas et al. |
| 5,986,869 A | 11/1999 | Akdag |
| 6,054,905 A | 4/2000 | Gresko |
| 6,060,182 A | 5/2000 | Tanaka et al. |
| 6,061,223 A | 5/2000 | Jones et al. |
| 6,086,544 A | 7/2000 | Hibner et al. |
| 6,115,227 A | 9/2000 | Jones et al. |
| 6,137,352 A | 10/2000 | Germann |
| 6,141,194 A | 10/2000 | Maier |
| 6,177,849 B1 | 1/2001 | Barsellotti et al. |
| 6,226,166 B1 | 5/2001 | Gumley et al. |
| 6,236,551 B1 | 5/2001 | Jones et al. |
| 6,243,247 B1 | 6/2001 | Akdag et al. |
| 6,252,755 B1 | 6/2001 | Willer |
| 6,281,690 B1 | 8/2001 | Frey |
| 6,292,344 B1 | 9/2001 | Glaser et al. |
| 6,342,998 B1 | 1/2002 | Bencivenga et al. |
| 6,381,283 B1 | 4/2002 | Bhardwaj et al. |
| 6,385,030 B1 | 5/2002 | Beene |
| 6,394,122 B1 | 5/2002 | Sibley et al. |
| 6,421,220 B2 | 7/2002 | Kobsa |
| 6,502,599 B1 | 1/2003 | Sibley et al. |
| 6,527,004 B1 | 3/2003 | Sibley et al. |
| 6,535,369 B1 * | 3/2003 | Redding et al. ............... 361/111 |
| 6,650,203 B2 | 11/2003 | Gerstenberg et al. |
| 6,721,155 B2 | 4/2004 | Ryman |
| 6,754,060 B2 | 6/2004 | Kauffman |
| 6,757,152 B2 | 6/2004 | Galvagni et al. |
| 6,782,329 B2 | 8/2004 | Scott |
| 6,785,110 B2 | 8/2004 | Bartel et al. |
| 6,789,560 B1 | 9/2004 | Sibley et al. |
| 6,814,100 B1 | 11/2004 | Sibley et al. |
| 6,816,348 B2 | 11/2004 | Chen et al. |
| 6,968,852 B1 | 11/2005 | Sibley |
| 6,975,496 B2 | 12/2005 | Jones et al. |
| 7,082,022 B2 | 7/2006 | Bishop |
| 7,092,230 B2 | 8/2006 | Inauen |
| 7,104,282 B2 | 9/2006 | Hooker et al. |
| 7,106,572 B1 | 9/2006 | Girard |
| 7,130,103 B2 | 10/2006 | Murata |
| 7,159,236 B2 | 1/2007 | Abe et al. |
| 7,221,550 B2 | 5/2007 | Chang et al. |
| 7,250,829 B2 | 7/2007 | Namura |
| 7,338,547 B2 | 3/2008 | Johnson et al. |
| 7,371,970 B2 | 5/2008 | Flammer et al. |
| 7,430,103 B2 | 9/2008 | Kato |
| 7,453,268 B2 | 11/2008 | Lin |
| 7,471,172 B2 | 12/2008 | Holst et al. |
| 7,507,105 B1 | 3/2009 | Peters et al. |
| 7,623,332 B2 | 11/2009 | Frank et al. |
| 7,808,752 B2 | 10/2010 | Richiuso et al. |
| 7,817,398 B1 | 10/2010 | Maples |
| 2002/0167302 A1 | 11/2002 | Gallavan |
| 2002/0191360 A1 | 12/2002 | Colombo et al. |
| 2003/0072121 A1 | 4/2003 | Bartel et al. |
| 2003/0211782 A1 | 11/2003 | Esparaz et al. |
| 2004/0042149 A1 | 3/2004 | Devine et al. |
| 2004/0121648 A1 | 6/2004 | Voros |
| 2004/0145849 A1 | 7/2004 | Chang et al. |
| 2004/0264087 A1 | 12/2004 | Bishop |
| 2005/0036262 A1 | 2/2005 | Siebenthall et al. |
| 2005/0044858 A1 | 3/2005 | Hooker et al. |
| 2005/0176275 A1 | 8/2005 | Hoopes et al. |
| 2005/0185354 A1 | 8/2005 | Hoopes |
| 2006/0038635 A1 | 2/2006 | Richiuso et al. |
| 2006/0120005 A1 | 6/2006 | Van Sickle |
| 2006/0139832 A1 | 6/2006 | Yates et al. |
| 2006/0146458 A1 | 7/2006 | Mueller |
| 2007/0053130 A1 | 3/2007 | Harwath |
| 2007/0095400 A1 | 5/2007 | Bergquist et al. |
| 2007/0097583 A1 | 5/2007 | Harwath |
| 2007/0139850 A1 | 6/2007 | Kamel et al. |
| 2009/0103226 A1 | 4/2009 | Penwell et al. |
| 2009/0109584 A1 | 4/2009 | Jones et al. |
| 2009/0284888 A1 | 11/2009 | Bartel et al. |
| 2009/0296430 A1 | 12/2009 | Rieux-Lopez et al. |
| 2011/0080683 A1 | 4/2011 | Jones et al. |
| 2011/0141646 A1 | 6/2011 | Jones et al. |
| 2011/0159727 A1 | 6/2011 | Howard et al. |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 95/10116 | 4/1995 |
| WO | PCT/US03/17050 | 5/2003 |
| WO | WO 2011-119723 | 12/2011 |

* cited by examiner

SURGE PROTECTION DEVICES THAT FAIL AS AN OPEN CIRCUIT

CROSS REFERENCE TO RELATED APPLICATIONS

This application claims the benefit and priority of U.S. Provisional Application No. 61/424,444, filed on Dec. 17, 2010, the entire contents of which are hereby incorporated by reference.

BACKGROUND

1. Field

The present invention generally relates to surge protectors and improvements thereof. More particularly, the present invention relates to surge protectors capable of consistent fail open functionality and improvements thereof.

2. Description of the Related Art

Communications equipment, computers, home stereo amplifiers, televisions and other electronic devices are increasingly manufactured using a variety of electronic components that are vulnerable to damage from electrical energy surges. Surge variations in power and transmission line voltages, as well as noise, can change the operating frequency range of connected equipment and severely damage or destroy electronic devices. Electronic devices impacted by these surge conditions can be very expensive to repair or replace. Therefore, a cost effective way to protect these devices and components from power surges is needed.

One common problem in protecting electronic systems, devices and components from power surges is the unpredictable failure states of many currently utilized surge protection solutions. This is because the surge protection used in such systems, devices and components typically incorporate components that have erratic failure states. For example, a diode protection scheme utilized for a communication system may fail as a short at one surge current, but fail open under alternative surge or environmental conditions. Gas tubes, metal oxide varistors (MOVs), diodes, sidactors and other voltage or current limiting devices can similarly exhibit differing failure modes depending upon the environment, system and/or exposure to particular surge currents or voltages.

Fuses, exhibiting a predictable open failure state, have been implemented as safety components in communication or other electronic systems. A fuse is a device that will fail open once it has been exposed to high enough current over a given period of time. However, fuses are not very accurate with respect to performance under short surge duration events. In addition, fuses have extreme performance variations over temperature. For example, a fuse in −40 degree Celsius temperature will take a relatively long time period to fail in the open state. Thus, fuses represent a less than ideal solution for surge protection or suppression despite their heightened failure state predictability.

In addition to fuses, circuit breakers and ground fault interrupt (GFI) circuits are other examples of devices that fail with a predictable open state. Unfortunately, circuit breakers are slow in reaction and tend to let through the majority of surge currents present. GFI circuits look for differential current flow through the circuit wires and do not activate if the surge currents flow through both of the circuit wires. These limitations of circuit breakers and GFI circuits, similar to fuses, yield inadequate surge protection solutions for many systems. The lacking surge protection characteristics of such devices outweigh their predictability in failure states and make them unacceptable for many system or device protection schemes.

Therefore, it is important for many electrical systems to fail in a predictable open condition for a variety of safety reasons. It is undesirable for a surge protection device to take down or render ineffective or inoperable an entire electrical system when only one node of the system is affected. In light of the above described limitations, the current state of the art for fail open devices have undesirable limitations that prove unsuccessful in adequately limiting surge currents and thus cannot sufficiently protect the connected equipment. Ideally, a surge protection device would offer adequate surge protection to a connected system while failing in an open failure state. It would thus be desirable to have a surge protection device that has a predictable or consistent open failure mode.

SUMMARY

An apparatus for protecting hardware devices from surges is disclosed. In one embodiment, a surge protection device may include a ground terminal and a signal terminal. A surge protection element is coupled with the ground terminal and the signal terminal and is configured to fail as a conductor. A switch is coupled with the surge protection element, the switch having a first position and a second position. The first position of the switch is configured to allow transmittal of a signal from the signal terminal, through the surge protection element, and to the ground terminal. The second position of the switch is configured to prevent transmittal of a signal from the signal terminal, through the surge protection element, and to the ground terminal. A control element is configured to control the movement of the switch from the first position to the second position if the surge protection element fails as a conductor.

In another embodiment, a surge protection apparatus for failing as an open circuit may include a frame, a first signal terminal coupled to the frame, a second signal terminal coupled to the frame, and a ground terminal coupled to the frame. A first surge protection component is coupled to the frame and is configured to fail as a short, the first surge protection component electrically connected with the first signal terminal. A second surge protection component is coupled to the frame and is configured to fail as a short, the second surge protection component electrically connected with the second signal terminal. A first switch is coupled to the frame and is electrically connected with the first surge protection component. A second switch is coupled to the frame and is electrically connected with the second surge protection component. A switch controlling component is coupled to the frame and is configured to change a configuration of the first switch or the second switch in response to the first surge protection component failing as a short or the second surge protection component failing as a short.

In still another embodiment, a method of surge protection to fail as an open circuit may include the steps of providing a surge protection element that fails as a short circuit, providing a switch coupled to the surge protection element, the switch having a first position and a second position, maintaining the switch in the first position when the surge protection element has not failed as a short circuit, conducting a signal along a first signal path through the surge protection element when the switch is in the first position, switching the switch from the first position to the second position if the surge protection element fails as a short circuit, and preventing a signal from conducting along the first signal path when the switch is in the second position.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
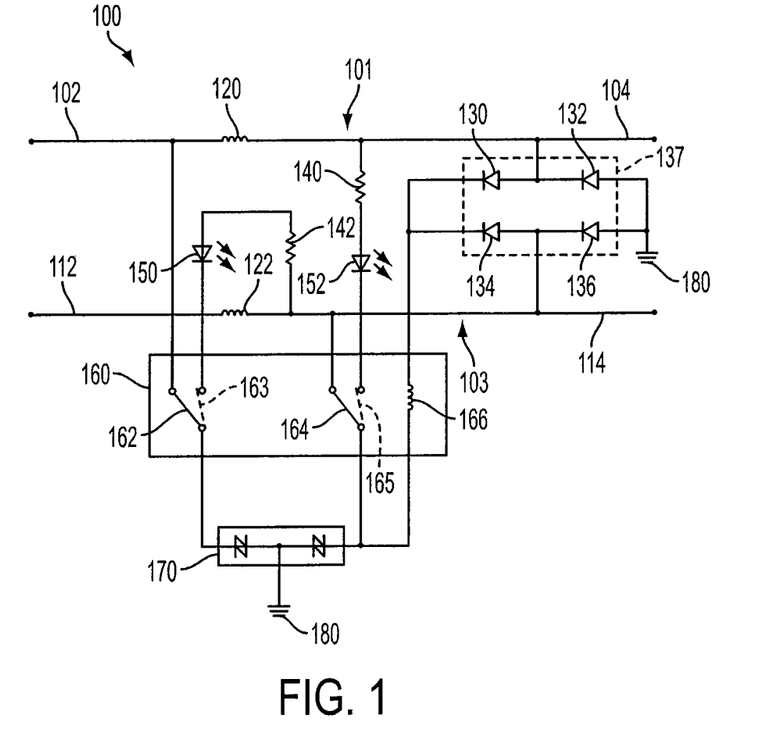
FIG. 1 is a schematic circuit diagram of a surge protector that fails as an open circuit having LED notification, according to an embodiment of the invention.

Referring now to FIG. 1, a schematic circuit diagram 100 is shown for a surge protector that fails as an open circuit and has light-emitting diode (LED) notification. The surge protector incorporating the schematic circuit diagram 100 is designed to offer surge protection and, at the moment or close to the moment a surge protection component or components fail, use a relay, contactor, or other switching device to open a circuit path, as discussed in greater detail herein. The schematic circuit diagram 100 includes a number of different electrical components, such as a surge protection element (e.g. gas tube), a relay, resistors and diodes that may be attached or mounted to a printed circuit board, as discussed in greater detail for FIG. 4. For illustrative purposes, the schematic circuit diagram 100 will be described with reference to specific electrical components to achieve specific operation and/or power requirements. However, other electrical components and/or component values or configurations may be used to achieve other desired characteristics in alternative embodiments.

The schematic circuit diagram 100 includes a first signal rail 101 extending along a path from line input 102 to line output 104. The schematic circuit diagram 100 also includes a second signal rail 103 extending along a path from a line input 112 to a line output 114. A non-surge signal present at the line input 102 may travel to the line output 104 and a non-surge signal applied at the line input 112 may travel to the line output 114. Equipment connected at line outputs 104 or 114 may also be vulnerable to current or voltage surges that can propagate along either the first signal rail 101 or the second signal rail 103. Inductances (120, 122) may be present along the first signal rail 101 and/or the second signal rail 103. Alternatively, the line input 102 may be directly connected to the line output 104 or the line input 112 may be directly connected to the line output 114.

To effectively mitigate the potential damage to any connected systems or equipment, a surge protection device or surge protection component is electrically connected to the first signal rail 101 and the second signal rail 103, as discussed in greater detail herein. A surge protection device embodying the schematic circuit diagram 100 may be a three-terminal device with a first terminal for connecting to the first signal rail 101, a second terminal for connecting to the second signal rail 103 and a third terminal for connecting to a ground 180. Various components are thus coupled between or off of the first signal rail 101 and/or the second signal rail 103 to ground 180 for diverting of surge signals off of the first signal rail 101 and/or the second signal rail 103 before the surge signals can encounter or damage any connected system or equipment.

Turning more specifically to the various components used in the schematic circuit diagram 100, a surge protection element 170 is connected through a relay 160 to the first signal rail 101 and the second signal rail 103. The surge protection element 170 may be a gas tube as shown or, alternatively, a TVS diode, a MOV, or any other type of surge protection element for conducting or shunting a surge to ground and away from any protected systems or equipment. The relay 160 has a coil 166 for controlling the positioning of two switches (162, 164). Upon energizing the coil 166, the switch 162 moves or switches from its first position (currently demonstrated in FIG. 1) to its secondary position (as shown by dashed line 163) and engages its currently unconnected contact. Similarly, upon energizing the coil 166, the switch 164 moves or switches from its first position (currently demonstrated in FIG. 1) to its secondary position (as shown by dashed line 165) and engages its currently unconnected contact. In this manner, the relay 160 forms an open circuit with respect to surges on the first signal rail 101 and the second signal rail 103 when the switches (162, 164) are in their secondary positions (163, 165), as discussed in greater detail herein.

During non-surge events and without any failure of the surge protection element 170, currents and voltages flow along the first and second signal rails (101, 103) to any connected system or equipment. Upon propagation of a surge signal along either the first signal rail 101 or the second signal rail 103, the surge protection element 170 begins to conduct, thus shorting or shunting the surge to ground 180. However, the surge protection element 170 may fail as a short, and thus directly connect the ground 180 to either or both of the first or second signal rails (101, 103), even during non-surge events. For example, the surge protection element 170 may be a 3-pole gas tube with Trigard technology that is specified to fail short, such as after 20 total 20 kA surges or 1 total 40 kA surge. Such shorted failure operation can cause severe safety issues and/or disrupt the operations of any connected system or equipment. In light of such failures, the relay 160 operates to maintain an open circuit between the first signal rail 101 and ground 180 and the second signal rail 103 and ground 180, even though the surge protection element 170 has failed as a short.

A bridge full wave rectifier 137 made up of four diodes (130, 132, 134, 136) is connected to the first and second signal rails (101, 103) and to the coil 166 of the relay 160. The rectifier 137 converts AC signals on the first and second signal rails (101, 103) to a DC signal for use by the coil 166 of the relay 160. In one embodiment, the rectifier 137 may specify high surge current capability along with low leakage current for surviving surge signals. Alternative configurations for rectification may also be utilized in an alternative embodiment. In still another embodiment, no rectification may be needed, for example if the coil 166 of the relay 160 is an AC coil and the first and second signal rails (101, 103) propagate AC signals, or if the coil 166 of the relay 160 is a DC coil and the first and second signal rails (101, 103) propagate DC signals.

If the surge protection element 170 has not failed as a short, there exists an open connection between the coil 166 of the relay 160 and ground 180, thus prohibiting a signal path through the rectifier 137, the coil 166, and to ground 180. The relay 160 is thus powered down and completely passive when the surge protection element 170 has not failed as a short. However, upon failure of the surge protection element 170 as a short, a conductive path to ground 180 is created, thus energizing the coil 166 of the relay 160. The switches (162, 164) of the relay 160 subsequently switch to their secondary positions (163, 165) or configurations, thus creating an open circuit between the first signal rail 101 and ground 180 and the second signal rail 103 and ground 180, despite the failure short of the surge protection element 170. At this point, neither the first nor second signal rails (101, 103) have surge protection.

To notify a user that the first and second signal rails (101, 103) are currently operating without surge protection, two notification LEDs (150, 152) are employed. When the switches (162, 164) of the relay 160 are switched to their secondary positions (163, 165) upon energizing the coil 166, a conductive path through the notification LEDs (150, 152) and their associated current limiting resistors (142, 140) is created. Thus, a user may identify when replacement of the surge protection element 170 is required by examining the state of the notification LEDs (150, 152). Greater or fewer of the notification LEDs (150, 152) may be utilized in an alternative embodiment. Moreover, other indicating elements or means of notification may be employed, in addition to or in replacement of the notification LEDs (150, 152). For example, the relay 160 may operate a mechanical component that visibly shifts its position depending upon the orientation of either or both of the two switches (162, 164). In still another embodiment, no notification may be utilized.

Thus, if the relay 160 survives a surge event and the surge protection element 170 fails short, then the relay 160 engages and both the first and second signal rails (101, 103) are opened to ground 180 without protection. If the surge protection element 170 survives a surge event, then the two switches (162, 164) of the relay 160 switches remain as shown and the circuit continues to function normally with the notification LEDs (150, 152) off and minimum power being consumed. If the relay 160 does not survive a surge event, then the switches (162, 164) are burned or fail open and both the first and second signal rails (101, 103) are opened without protection. The relay 160 may be a double pole, double throw relay as shown or may include multiple single pole double throw switches. In an alternative embodiment, any number of switches, poles or throws may be utilized depending upon desired notification or circuit characteristics. In addition, any alternative switching components may be utilized in place of the relay 160 in other embodiments.

Figure 2:
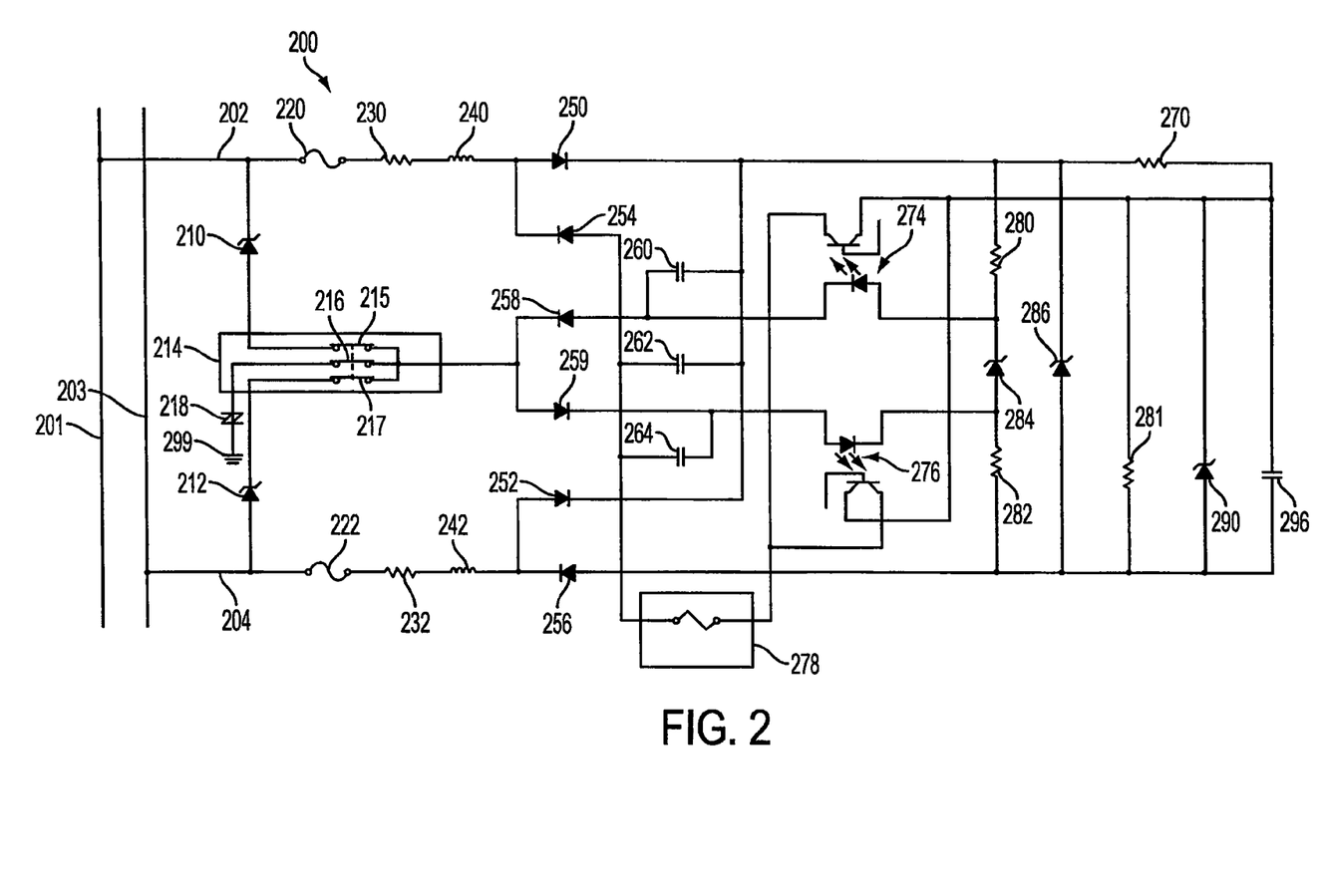
FIG. 2 is a schematic circuit diagram of a surge protector that fails as an open circuit without LED notification, according to an embodiment of the invention.

Turning next to FIG. 2, a schematic circuit diagram 200 is shown for a surge protector device that fails as an open circuit and does not utilize LED notification. The schematic circuit diagram 200 is designed to offer surge protection and, at the moment or close to the moment a surge protection component or components of the schematic circuit diagram 200 fail, control a relay or other switching device to open the circuit, as discussed in greater detail herein. The schematic circuit diagram 200 includes a number of different electrical components, such as TVS diodes, a gas tube, a relay, resistors, capacitors and diodes that may be attached or mounted to a printed circuit board or otherwise coupled to a frame or housing of the surge protector device, as discussed in greater detail for FIG. 4. For illustrative purposes, the schematic circuit diagram 200 will be described with reference to specific electrical components to achieve specific operation and/or power requirements. However, other electrical components and/or component value or configurations may be used to achieve other desired characteristics in alternative embodiments.

The schematic circuit diagram 200 includes a first connection 202 for connecting to a first signal line 201 and a second connection 204 for connecting to a second signal line 203. The first connection 202 may be made via a first signal terminal of the surge protector device incorporating the schematic circuit diagram 200 and the second connection 204 may be made via a second signal terminal of the surge protector device incorporating the schematic circuit diagram 200. A surge signal that propagates along the first signal line 201 will thus make electrical contact with the first connection 202 of the surge protector device incorporating the schematic circuit diagram 200. Similarly, a surge signal that propagates along the second signal line 203 will thus make electrical contact with the second connection 204 of the surge protector device incorporating the schematic circuit diagram 200. Any systems or equipment connected to the first signal line 201 or the second signal line 203 will thus be protected from such surge signals since the surge may be safely diverted away, as discussed in greater detail herein.

If the surge signal is above a predetermined surge threshold, TVS diodes (210, 212) and a gas tube 218 will begin to conduct and thus divert the surge signal away from either or both of the first signal line 201 or the second signal line 203 to a ground connection 299. In one embodiment, the TVS diodes (210, 212) may be 20V, 10 kA diodes. In another embodiment, the TVS diode 210 may be a 45V, 391.5 A diode while the TVS diode 212 may be a 28V, 606 A diode. In an alternative embodiment, any surge protection components or elements may be used in replacement of or in addition to any or all of the TVS diodes (210, 212) or the gas tube 218. The ground connection 299 may be made via a ground terminal of the surge protector device incorporating the schematic circuit diagram 200.

A switching device 214 having a first switch 215, a second switch 216, and a third switch 217 is connected to the TVS diodes (210, 212) and the gas tube 218. The switching device 214 allows for the transmittal or prevention of one or more signals to conduct through one or more of the TVS diodes (210, 212) and through the gas tube 218 to the ground connection 299. By manipulating the configuration of the first switch 215, the second switch 216, and/or the third switch 217, signal paths between either or both of the TVS diodes (210, 212) and the gas tube 218 are shorted or opened. A solenoid 278 or other switch control device is configured to change the configuration of the first switch 215, the second switch 216, and/or the third switch 217 when the solenoid 278 is activated by a flowing electrical current. The solenoid 278 may simultaneously change the configuration of the first switch 215, the second switch 216, and/or the third switch 217.

Various other components are electrically connected as part of the schematic circuit diagram 200. A plurality of diodes (250, 252, 254, 256) serve as a full wave rectifier bridge to create DC power under non-surge conditions. Diodes (258, 259) are used if one or both of the TVS diodes (210, 212) fail as a short, and operate to become half of a power supply bridge to optocouplers (276, 274), as discussed in greater detail herein. The diodes (250, 252, 254, 256, 258, 259) may be MR854 diodes. Filter capacitors (260, 262, 264, 296) provide some electrical charge storage capacity and aid in stabilizing what may be sporadic AC signals present upon the first and second signal lines (201, 203) to which the surge protector device incorporating the schematic circuit diagram 200 is connected. The capacitors (260, 262, 264) may be 470 uF, 25 Vdc capacitors while the capacitor 296 may be a 9 F, 3 Vdc capacitor. Diodes (284, 286, 290) are included for preventing false triggering of the solenoid 278. Diodes (284, 290) may be 3V diodes while the diode 286 may be a 30V diode. Resistors (230, 232, 270, 280, 282, 281) may be included for current limiting purposes. Resistors (230, 232, 270) may be 4.7 ohm resistors. Resistors (280, 282) may be 330 ohm resistors. Resistor 281 may be a 5.6 k ohm resistor. Fuses (220, 222) are connected to the first connection 202 and the second connection 204, respectively, and are configured to open in the event of an overcurrent of a particular threshold caused by failure of one or more of the previously described components. The fuses (220, 222) may be 0.5 amp fuses. Inductors (240, 242) may be connected in a serial configuration with the fuses (220, 222), respectively. The inductors (240, 242) may be 1 mH inductors. Any or all of the previously described various components may be connected in differing configurations, chosen to have differing values, omitted completely, or connected with additional circuit components without departing from the spirit of the invention for providing a fail open surge protection device.

In operation, when neither of the TVS diodes (210, 212) has failed as a short, the first switch 215, the second switch 216, and the third switch 217 of the switching device 214 are in a normally-closed configuration or position as shown. However, upon a failure of either or both of the TVS diodes (210, 212) as a short, a conductive path is created through either or both of the TVS diodes (210, 212), through one or more of the switches (215, 216, 217) of the switching device 214, through one or both of the diodes (258, 259), and through one or both of the optocouplers (276, 274). Upon activation of one or both of the optocouplers (276, 274), a current is allowed to flow through the solenoid 278. The solenoid 278 controls the positioning of the first switch 215, the second switch 216, and the third switch 217 of the switching device 214. Thus, when no current is flowing through the solenoid 278, the three switches of the switching device 214 are positioned or configured in the normally-closed position or configuration and minimal power is consumed. Upon a current flowing through the solenoid 278, in response to the failure of one or both of the TVS diodes (210, 212), the solenoid 278 is energized and opens the three switches (215, 216, 217) in the switching device 214.

In an alternative embodiment, greater or fewer switches may be incorporated as part of the switching device 214 or may be discrete components not part of any switching device 214. Moreover, the solenoid 278 may be any type of controlling component, such as a gear motor, configured to change a configuration of one or more of the switches (215, 216, 217) used for opening or closing a signal path through any of the TVS diodes (210, 212) to the ground connection 299. Furthermore, a delay may be incorporated after failure of any or all of TVS diodes (210, 212) and before energization of the solenoid 278, as described in more detail for FIG. 3.

In certain embodiments, a visual element for notifying a user when any or all of the switches (215, 216, 217) are in their open position or configuration may be included. This visual element may be a light-emitting diode or any other type of indicator that is visible to a user. In an alternative embodiment, other forms of user notification may be utilized, for example, providing an audible noise or chime, or by providing an output signal, connectible to other circuits or systems.

Figure 3:
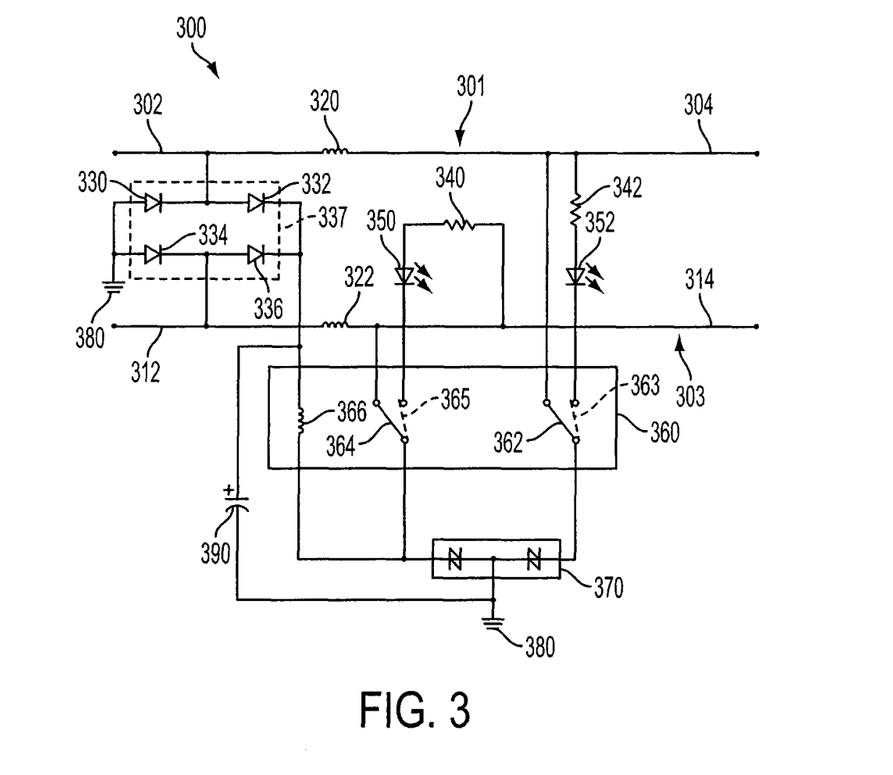
FIG. 3 is a schematic circuit diagram of a surge protector that fails as an open circuit having LED notification and incorporating a delay, according to an embodiment of the invention.

Referring now to FIG. 3, a schematic circuit diagram 300 is shown of a surge protector including LED notification and that fails as an open circuit after a delay. Generally, the schematic circuit diagram 300 may have certain structure and functional features that are similar to those of the schematic circuit diagram 100, previously described for FIG. 1. Notwithstanding these similarities, the schematic circuit diagram 300 may be distinguished from the schematic circuit diagram 100 based primarily on the addition of a delay before opening a circuit path after failure of a surge protection element as a short.

The schematic circuit diagram 300 includes a first signal rail 301 extending along a path from a line input 302 to a line output 304. The schematic circuit diagram 300 also includes a second signal rail 303 extending along a path from a line input 312 to a line output 314. A surge protection element 370 is connected between a ground 380 and through a relay 360 to the first signal rail and the second signal rail. The surge protection element 370 may be a gas tube, a TVS diode, a MOV, or any other type of surge protection element, the same or similar to the surge protection element 170 of FIG. 1. The relay 360 has a coil 366 for controlling the positioning of two switches (362, 364). The same or similar to the schematic circuit diagram 100 of FIG. 1, upon energizing the coil 366, the switch 362 moves or switches from its first position (currently demonstrated in FIG. 3) to its secondary position (as shown by dashed line 363) and engages its currently unconnected contact. Similarly, upon energizing the coil 366, the switch 364 moves or switches from its first position (currently demonstrated in FIG. 3) to its secondary position (as shown by dashed line 365) and engages its currently unconnected contact.

A bridge full wave rectifier 337 made up of four diodes (330, 332, 334, 336) is connected to the first and second signal rails (301, 303) and to the coil 366 of the relay 360. Alternative rectification methods, or no rectification means, may be utilized in alternative embodiments, as previously discussed for FIG. 1.

Operation of the circuit shown by the schematic circuit diagram 300 is similar to the schematic circuit diagram 100 and utilizes notification LEDs (350, 352) with current limiting resistors (340, 342) to indicate when the switches (362, 364) are in their secondary positions (363, 365). However, instead of moving or changing the switches (362, 364) to their secondary positions immediately after the surge protection element 370 fails as a short, a delay is created by a capacitor 390 connected across the coil 366 of the relay 360 to the ground 380. The capacitor 390 creates a delay after the failure of the surge protection element 370 before the coil 366 of the relay 360 is energized, thus delaying the switching of the switches (362, 364). This delay eliminates a momentary short seen across the first and second signal rails (301, 303) that otherwise occurs when the coil 366 is permitted to energize immediately upon the surge protection element 370 failing as a short. In an alternative embodiment, other circuit configurations may be used to incorporate the above described delay. Other aspects of the schematic circuit diagram 300 may be the same or similar to those previously discussed for FIG. 1.

Figure 4:
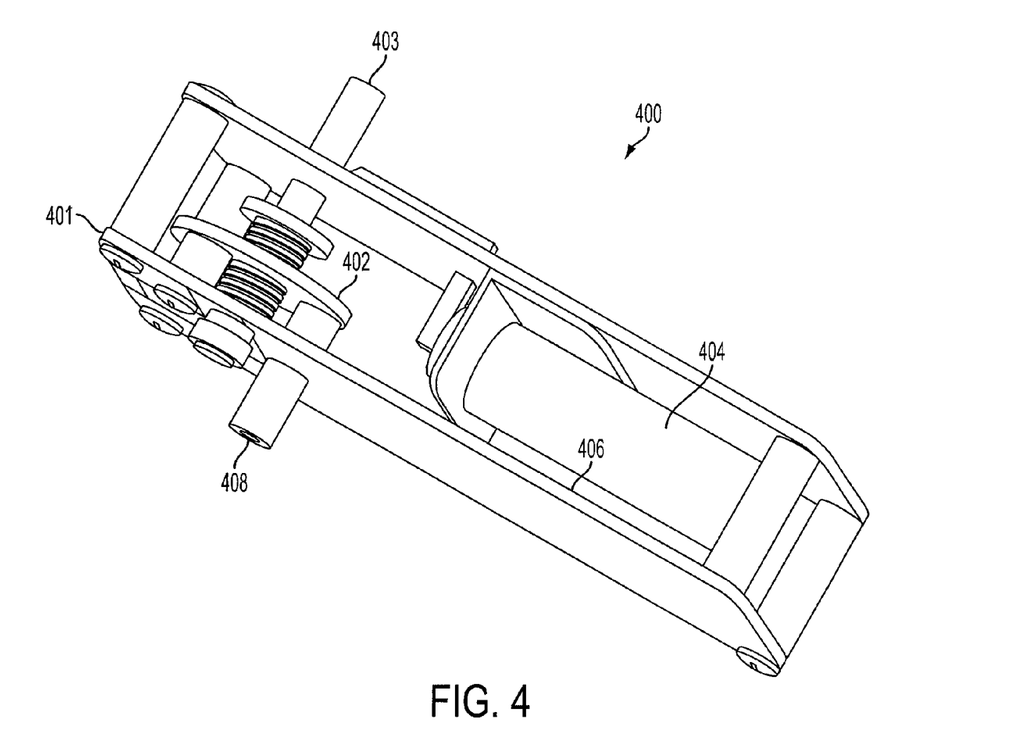
FIG. 4 is a perspective view of components of a surge protection device that fails as an open circuit, according to an embodiment of the invention.

FIG. 4 shows a perspective view of components of a surge protection device 400 that fails as an open circuit. The surge protection device 400 includes a frame 401 to which a printed circuit board 406 is coupled for providing surge protection components thereon. The printed circuit board 406 and/or the frame 401 may include various circuit components and/or electrical terminals for providing surge protection to a user's system or equipment via one or more connected signal lines, for example, by incorporating a circuit shown by any of the schematic circuit diagrams 100, 200, or 300, previously described for FIGS. 1-3. The printed circuit board 406 may be mounted to the frame mechanically via screws, brackets, adhesives, or any other form of attachment.

A ground pin 408 is coupled with the frame for providing a ground reference and is in electrical contact with one or more components of the printed circuit board 406. A solenoid 404 or other switch controlling component is coupled with the frame 401 and interfaces with a switch 402, also coupled with the frame 401, for operation as discussed in greater detail for FIGS. 1-3. The switch 402 may have any number of contacts or, if multiple switching paths are desired, a plurality of switches may be utilized, each switch changing configuration or position in response to energization of the solenoid 404 or other switch controlling component. The switch 402 may be configured to provide a visual indication or notification to a user based upon the configuration or position of the switch 402, for example by physically shifting a mechanical component 403 of the switch 402 that is viewable by a user when the switch 402 changes configuration or position. Alternatively, lights or other indicators may be disposed on the printed circuit board 406 or otherwise coupled to the frame 401 of the surge protection device 400 for notification purposes to a user.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A surge protection device comprising:
   a ground terminal and a signal terminal;
   a surge protection element coupled with the ground terminal and the signal terminal and configured to fail as a conductor;
   a switch coupled with the surge protection element and having a first position and a second position,
      the first position of the switch configured to allow transmittal of a signal from the signal terminal, through the surge protection element, to the ground terminal, and
      the second position of the switch configured to prevent transmittal of a signal from the signal terminal, through the surge protection element, to the ground terminal; and
   a control element configured to control the movement of the switch from the first position to the second position if the surge protection element fails as a conductor,
   wherein the surge protection element failing as a conductor creates a conductive path through the control element,
   wherein a current flows across the conductive path through the control element and causes the movement of the switch from the first position to the second position.

2. The surge protection device of claim 1 wherein the control element is a gear motor.

3. The surge protection device of claim 1 wherein the control element is a solenoid.

4. The surge protection device of claim 1 further comprising an indicating element configured to visually indicate if the switch is in the second position.

5. The surge protection device of claim 4 wherein the indicating element is a light-emitting diode coupled with the switch.

6. The surge protection device of claim 4 wherein the indicating element is a mechanical component, the mechanical component shifting from a first configuration to a second configuration when the switch moves from the first position to the second position.

7. The surge protection device of claim 1 wherein the surge protection element is selected from the group consisting of a gas tube, a TVS diode and a MOV.

8. The surge protection device of claim 1 further comprising a capacitor electrically connected with the ground and the control element for delaying the movement of the switch from the first position to the second position.

9. The surge protection device of claim 1 further comprising:
   a second signal terminal; and
   a second switch coupled with the surge protection element and having a first position and a second position,
      the first position of the second switch configured to allow transmittal of a signal from the second signal terminal, through the surge protection element, to the ground terminal, and
      the second position of the second switch configured to prevent transmittal of a signal from the second signal terminal, through the surge protection element, to the ground terminal,
   wherein the control element is configured to control the movement of the second switch from the first position of the second switch to the second position of the second switch if the surge protection element fails as a conductor.

10. A surge protection apparatus for failing as an open circuit comprising:
    a frame;
    a first signal terminal coupled to the frame;
    a second signal terminal coupled to the frame;
    a ground terminal coupled to the frame;
    a first surge protection component coupled to the frame and configured to fail as a short, the first surge protection component electrically connected with first signal terminal;
    a second surge protection component coupled to the frame and configured to fail as a short, the second surge protection component electrically connected with the second signal terminal;
    a first switch coupled to the frame and electrically connected with the first surge protection component;
    a second switch coupled to the frame and electrically connected with the second surge protection component; and
    a switch controlling component coupled to the frame and configured to change a configuration of the first switch or the second switch in response to the first surge protection component failing as a short or the second surge protection component failing as a short.

11. The surge protection apparatus of claim 10 wherein the switch controlling component is configured to simultaneously change a configuration of both the first switch and the second switch.

12. The surge protection apparatus of claim 10 wherein the switch controlling component is a gear motor.

13. The surge protection apparatus of claim 10 wherein the first switch or the second switch is configured to have a first configuration for conducting a signal through the switch and a second configuration for preventing a signal from being conducted through the switch.

14. The surge protection apparatus of claim 13 wherein the first switch or the second switch is coupled to a visual element, for notifying a user when the first switch or the second switch is in the second configuration.

15. The surge protection apparatus of claim 10 wherein the first surge protection component or the second surge protection component is selected from the group consisting of a gas tube, a TVS diode and a MOV.

16. The surge protection apparatus of claim 10 further comprising:
   a third surge protection component coupled to the frame and configured to fail as a short, the third surge protection component electrically connected with the ground terminal; and
   a third switch coupled to the frame and electrically connected with the third surge protection component,
   wherein the switch controlling component is configured to change a configuration of the third switch in response to the first surge protection component failing as a short or the second surge protection component failing as a short.

17. A method of surge protection to fail as an open circuit, the method comprising the steps of:
   providing a surge protection element that fails as a short circuit;
   providing a switch coupled to the surge protection element, the switch having a first position and a second position;
   providing a control element coupled to the surge protection element, the control element configured to move the switch between the first position and the second position;
   maintaining the switch in the first position when the surge protection element has not failed as a short circuit;
   conducting a signal along a first signal path through the surge protection element when the switch is in the first position;
   creating a conductive path through the control element, the conductive path created by the surge protection element failing as a short circuit,
   triggering the control element along the conductive path to move the switch from the first position to the second position; and
   preventing a signal from conducting along the first signal path when the switch is in the second position.

18. The method of claim 17 further comprising the step of indicating to a user when the switch is in the second position.

19. The method of claim 18 wherein the step of indicating to a user when the switch is in the second position includes illuminating a light.

20. The method of claim 17 further comprising the step of delaying the switching of the switch from the first position to the second position for a predetermined amount of time after the surge protection element fails as a short circuit.

21. A surge protection device comprising:
   a ground terminal and a signal terminal;
   a surge protection element coupled with the ground terminal and the signal terminal and configured to fail as a conductor;
   a switch coupled with the surge protection element and having a first position and a second position,
      the first position of the switch configured to allow transmittal of a signal from the signal terminal, through the surge protection element, to the ground terminal, and
      the second position of the switch configured to prevent transmittal of a signal from the signal terminal, through the surge protection element, to the ground terminal;
   a control element configured to control the movement of the switch from the first position to the second position if the surge protection element fails as a conductor; and
   a capacitor electrically connected with the ground and the control element for delaying the movement of the switch from the first position to the second position.

* * * * *